(12) United States Patent
Beal et al.

(10) Patent No.: US 7,248,695 B1
(45) Date of Patent: Jul. 24, 2007

(54) SYSTEMS AND METHODS FOR TRANSMITTING QUANTUM AND CLASSICAL SIGNALS OVER AN OPTICAL NETWORK

(75) Inventors: A. Craig Beal, Watertown, MA (US); Michael J. LaGasse, Nahant, MA (US)

(73) Assignee: MagiQ Technologies, Inc., New York, NY (US)

( * ) Notice: Subject to any disclaimer, the term of this patent is extended or adjusted under 35 U.S.C. 154(b) by 0 days.

(21) Appl. No.: 11/352,046

(22) Filed: Feb. 10, 2006

(51) Int. Cl.
*H04K 1/00* (2006.01)
*H04L 9/00* (2006.01)

(52) U.S. Cl. ..................... 380/256; 380/283

(58) Field of Classification Search .............. 380/256, 380/283
See application file for complete search history.

(56) References Cited

U.S. PATENT DOCUMENTS

| | | | | |
|---|---|---|---|---|
| 5,339,182 | A * | 8/1994 | Kimble et al. | 398/158 |
| 5,515,438 | A * | 5/1996 | Bennett et al. | 380/278 |
| 5,675,648 | A * | 10/1997 | Townsend | 380/278 |
| 6,081,119 | A * | 6/2000 | Carson et al. | 324/307 |
| 6,272,224 | B1 * | 8/2001 | Mazourenko et al. | 380/283 |
| 6,748,083 | B2 * | 6/2004 | Hughes et al. | 380/278 |
| 6,757,495 | B2 * | 6/2004 | Chang et al. | 398/51 |
| 7,102,121 | B2 * | 9/2006 | Lagasse | 250/227.14 |
| 2004/0109564 | A1 * | 6/2004 | Cerf et al. | 380/256 |
| 2004/0161109 | A1 * | 8/2004 | Trifonov | 380/277 |
| 2004/0233935 | A1 * | 11/2004 | Yuan et al. | 370/474 |
| 2005/0047601 | A1 * | 3/2005 | Shields et al. | 380/283 |
| 2005/0094818 | A1 * | 5/2005 | Inoue et al. | 380/278 |
| 2005/0100351 | A1 * | 5/2005 | Yuan et al. | 398/214 |
| 2005/0135627 | A1 * | 6/2005 | Zavriyev et al. | 380/278 |
| 2006/0045527 | A1 * | 3/2006 | Maeda et al. | 398/79 |
| 2007/0030971 | A1 * | 2/2007 | Sun et al. | 380/255 |

OTHER PUBLICATIONS

Chapuran et al, "Compatibility of Quantum Key Distribution with Optical Networking", Proceedings of SPIE, vol. 5815, pp. 164-175, 2005.

Subacius et al, "Backscattering limitation for fiber-optic quantum key distribution", Applied Physics Letters, No. 86, pp. 011103-1-3, 2005.

Goodman et al, "Quantum Cryprography for Optical Networks: A System Perspective", The 16th Annual Meeting of the IEEE, vol. 2, pp. 1040-1041, 2003.

* cited by examiner

*Primary Examiner*—Deandra M. Hughes
(74) *Attorney, Agent, or Firm*—Opticus IP Law PLLC

(57) ABSTRACT

Systems and methods for transmitting quantum and classical signals over an optical network are disclosed, wherein the quantum signal wavelength either falls within the classical signal wavelength band, or is very close to one of the classical signal wavelengths. The system includes a deep-notch optical filter with a blocking bandwidth that includes the quantum signal wavelength but not any of the classical signal wavelengths. The deep-notch optical filtering is applied to the classical signals prior to their being multiplexed with the quantum signals to prevent noise generated by the classical signals from adversely affecting transmission of quantum signals in the transmission optical fiber. Narrow-band filtering is also applied to the quantum signals prior to their detection in order to substantially exclude spurious non-quantum-signal wavelengths that arise from non-linear effects in the optical fiber. The present invention allows for the quantum and classical signals to have wavelengths within just a few nanometers of one another, which has benefits for both classical and quantum signal transmission on a common transmission optical fiber.

18 Claims, 6 Drawing Sheets

SYSTEMS AND METHODS FOR TRANSMITTING QUANTUM AND CLASSICAL SIGNALS OVER AN OPTICAL NETWORK

TECHNICAL FIELD OF THE INVENTION

The present invention relates to optical networks and quantum cryptography, and in particular relates to transmitting quantum signals over an optical network populated by classical signals.

BACKGROUND ART

QKD involves establishing a key between a sender ("Alice") and a receiver ("Bob") by using either single-photons or weak (e.g., 0.1 photon on average) optical signals (pulses) called "qubits" or "quantum signals" transmitted over a "quantum channel." Unlike classical cryptography whose security depends on computational impracticality, the security of quantum cryptography is based on the quantum mechanical principle that any measurement of a quantum system in an unknown state will modify its state. As a consequence, an eavesdropper ("Eve") that attempts to intercept or otherwise measure the exchanged qubits will introduce errors that reveal her presence.

The general principles of quantum cryptography were first set forth by Bennett and Brassard in their article "Quantum Cryptography: Public key distribution and coin tossing," Proceedings of the International Conference on Computers, Systems and Signal Processing, Bangalore, India, 1984, pp. 175-179 (IEEE, New York, 1984). Specific QKD systems are described in U.S. Pat. No. 5,307,410 to Bennett, and in the article by C. H. Bennett entitled "Quantum Cryptography Using Any Two Non-Orthogonal States", Phys. Rev. Lett. 68 3121 (1992). The general process for performing QKD is described in the book by Bouwmeester et al., "The Physics of Quantum Information," Springer-Verlag 2001, in Section 2.3, pages 27-33.

In a typical QKD system, Alice and Bob are optically coupled by an optical fiber that carries only the quantum signals. This facilitates detecting the quantum signals because there are no externally introduced sources of noise from other optical signals. However, incorporating QKD into existing optical networks requires that the quantum signals share the same optical fiber as "classical" (i.e., non-quantum) optical signals used in standard optical telecommunications. This complicates the QKD process because detecting the quantum signals is hampered by the presence of the classical signals as well as the relatively large amounts of noise they generate in the quantum channel.

One approach to transmitting quantum signals over an optical fiber populated by high-speed traffic in the form of classical signals is to transmit the quantum signals on a substantially different wavelength band than the classical signals. Such an approach is discussed in the article by Chapuran et al., entitled "Compatibility of quantum key distribution with optical networking," Proc. SPIE Vol. 5815 (2005), which article is incorporated by reference herein. The present state of the prior art teaches that the quantum and classical signals should be transmitted in wavelength bands separated by at least 150 nm. However, it is preferable to transmit both signals at much closer wavelengths. For example, in some cases it is advantageous to transmit both types of signals within the third telecom window (i.e., wavelengths around 1500 nm). The quantum signals benefit from the extended reach gained by operating near the optical fiber's maximum transparency wavelength (1550 nm) in this band. The classical signals also benefit from low attenuation as well as the wider variety of quality optical components available for these wavelengths, such as optical amplifiers.

SUMMARY OF THE INVENTION

A first aspect of the invention is a method of transmitting, over a transmission optical fiber, classical signals having corresponding classical wavelengths and quantum signals having a quantum signal wavelength. The method includes filtering the classical signals to block wavelengths that include the quantum signal wavelength. The classical signal filtering is performed over a narrow bandwidth centered on the quantum optical signal wavelength but that does not extend to the classical signal wavelengths. This narrow filtering immediately surrounding the quantum wavelength serves to reduce optical noise in the quantum channel caused by the classical signals. Signals within this band, although not present at the input of the transmission optical fiber, may appear at its output, such signals having been created within the fiber through nonlinear interactions of the classical signals. To compensate for this effect, the method also includes narrow-filtering the quantum signals just prior to their detection to substantially exclude spurious non-quantum signal wavelengths that could cause false detector counts. Examples of the method include the cases wherein: (a) at least one of the classical optical signal wavelengths is within 10 nm of the quantum signal wavelength; (b) the classical signal filtering bandwidth (optical filter 30) is 5 nm or less; and (c) the classical signal filtering bandwidth (optical filter 30) is 1 nm or less.

A second aspect of the invention is a method of transmitting classical signals and quantum signals over a transmission optical fiber. The method includes generating classical signals at respective classical signal wavelengths and generating quantum signals at a quantum signal wavelength that is between at least two of the classical signal wavelengths. The method also includes filtering the classical signals to block wavelengths that include the quantum signal wavelength but not the classical signal wavelengths, thereby forming filtered classical signals. The method also includes multiplexing the filtered classical signals and the quantum signals onto the transmission optical fiber. The method also includes narrow-band filtering the quantum signals just prior to their detection to exclude spurious non-quantum-signal wavelengths that appear at the output of the transmission optical fiber as a result of nonlinear interactions of the classical signals within the fiber and that could otherwise result in false detector counts.

A third aspect of the invention is an optical network system that includes a classical optical communications system adapted to generate and receive classical signals having respective classical signal wavelengths. The system also includes a quantum key distribution (QKD) system having two QKD stations (ALICE and BOB) respectively adapted to generate and receive quantum signals having a quantum signal wavelength. The system further includes a transmission optical fiber adapted to carry both the classical signals and the quantum signals from a transmission side of the network to a receiver side of the network. The system also includes a first optical filter arranged so as to filter the classical signals to substantially exclude wavelengths over a narrow spectral band that surrounds the quantum signal wavelength but that does not extend into the classical signal wavelengths. The system also has a multiplexing element arranged to combine the quantum signals and classical signals at the transmitter side of the network and a demultiplexing element arranged to separate the quantum signals and the classical signals at the receiver side of the network. A second optical filter is arranged at BOB to filter the quantum signal so as to substantially exclude non-quantum signal wavelengths that could cause false detector counts at BOB.

A fourth aspect of the invention is a system for transmitting, over a long-haul optical fiber network, classical signals having respective classical wavelengths representing a classical channel and quantum signals having a quantum signal wavelength representing a quantum channel. The system includes a demultiplexer adapted to separate the quantum channel and the classical channel. The system also includes, in the separated classical channel, an optical isolator, an optical amplifier optically coupled to the optical isolator, and a first narrow-bandpass optical filter optically coupled to the optical amplifier. The first optical filter has a blocking bandwidth centered on the quantum signal wavelength but not extending to any of the classical signal wavelengths, so as to form filtered classical signals from the inputted classical signals. The system also includes in the separated quantum channel, a second narrow band optical filter optically coupled to a quantum key distribution (QKD) station. The second optical filter substantially removes non-quantum signal wavelengths. The QKD system is adapted to receive the filtered first quantum signals from the second optical filter and form therefrom relayed quantum signals. The system also includes a multiplexer adapted to recombine the classical and quantum channels onto a transmission optical fiber that carries both the filtered classical signals and the relayed quantum signals.

Figure 1:
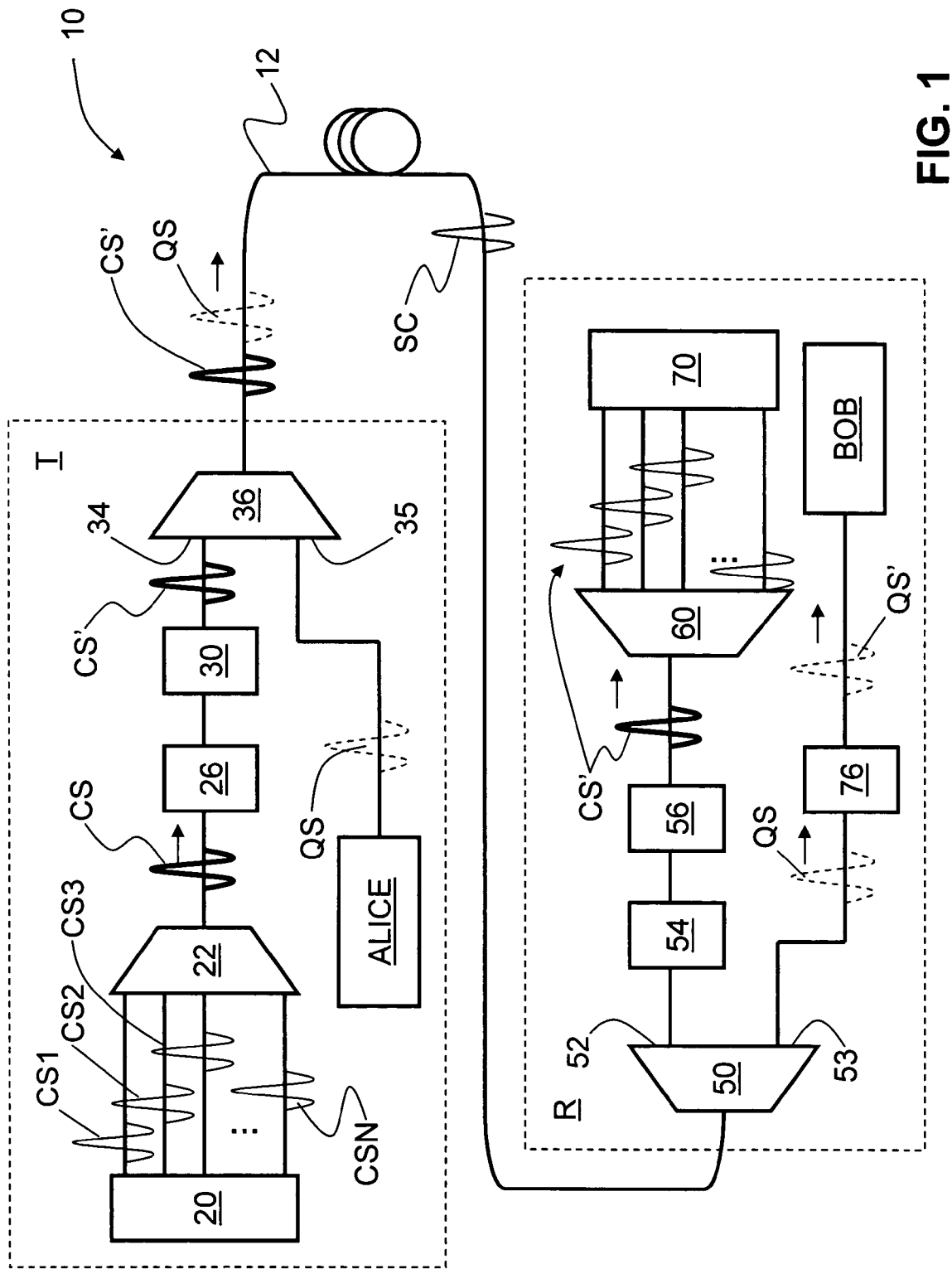
FIG. 1 is a schematic diagram of an example embodiment of an optical network according to the present invention that allows for the transmission of both quantum and classical signals at close wavelengths.

The various elements depicted in the drawing are merely representational and are not necessarily drawn to scale. Certain sections thereof may be exaggerated, while others may be minimized. The drawing is intended to illustrate an example embodiment of the invention that can be understood and appropriately carried out by those of ordinary skill in the art.

DETAILED DESCRIPTION OF THE INVENTION

The present invention includes systems and methods that allow for the transmission of both quantum (optical) signals QS at quantum signal wavelength and high-speed classical (optical) signals CS at classical signal wavelength over an optical fiber network, wherein the quantum and classical signal wavelengths are relatively close to one another. In a preferred embodiment, the optical coupling between elements as referred to below is accomplished using sections of optical fiber.

FIG. 1 is a schematic diagram of an optical network 10 according to the present invention. Network 10 includes a transmitter side T and a receiver side R optically coupled by a transmission optical fiber 12. On receiver side R, network 10 includes a multi-wavelength transmitter 20 optically coupled to a dense wavelength division multiplexer (DWDM) 22, which in turn is optically coupled to an erbium-doped fiber amplifier (EDFA) 26. EDFA 26 is optically coupled to a "deep notch" optical filter 30 having a sharp, narrow blocking bandwidth preferably centered about the quantum signal wavelength. Optical filter 30 is in turn optically coupled to the express port (often called the "reflect port") 34 of an optical add/drop multiplexer (OADM) 36, which is optically coupled to transmission optical fiber 12.

Figure 2:
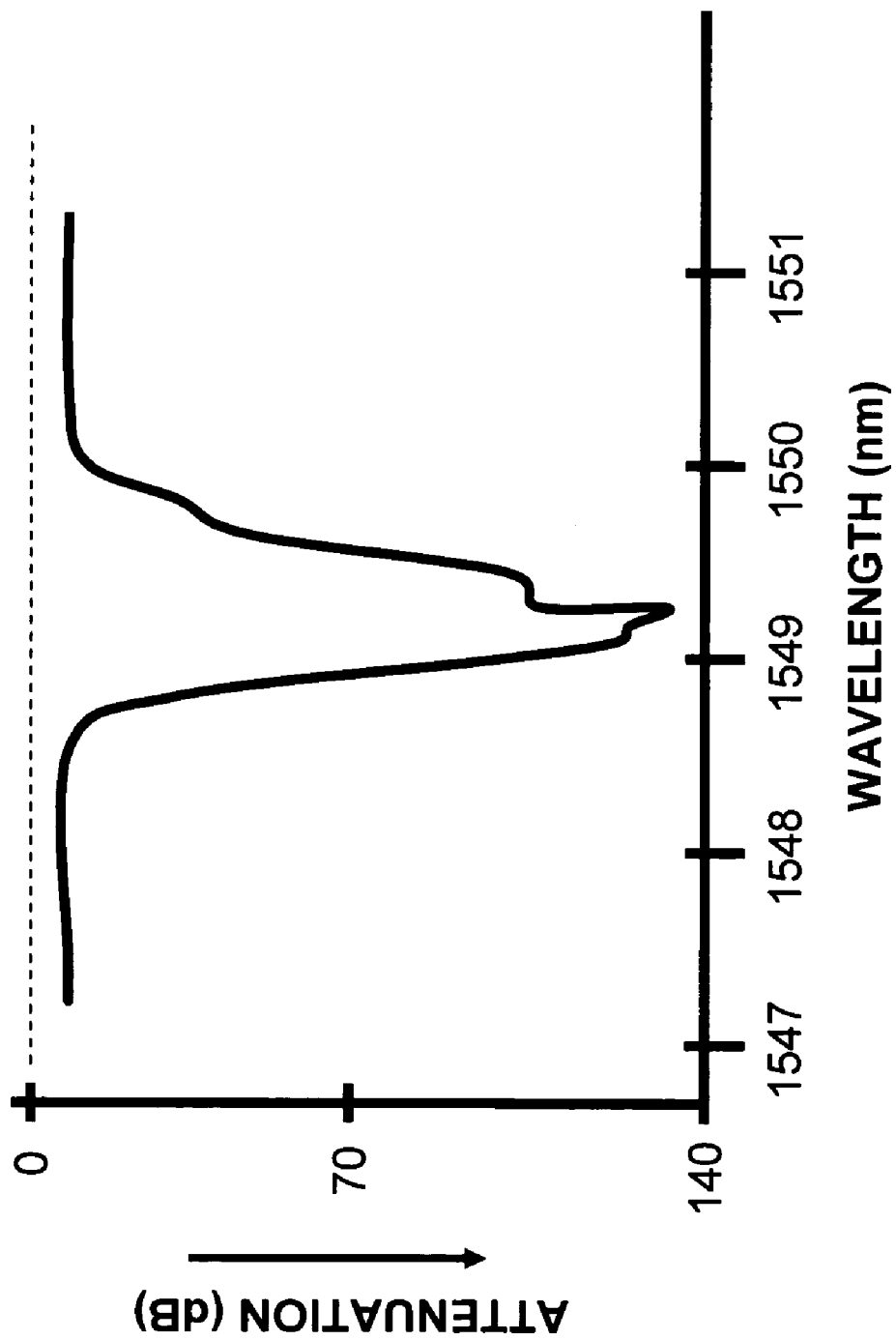
FIG. 2 is a plot of attenuation (dB) vs. wavelength (nm) for a first example of the deep-notch blocking optical filter as used in the optical network of FIG. 1.
Figure 3:
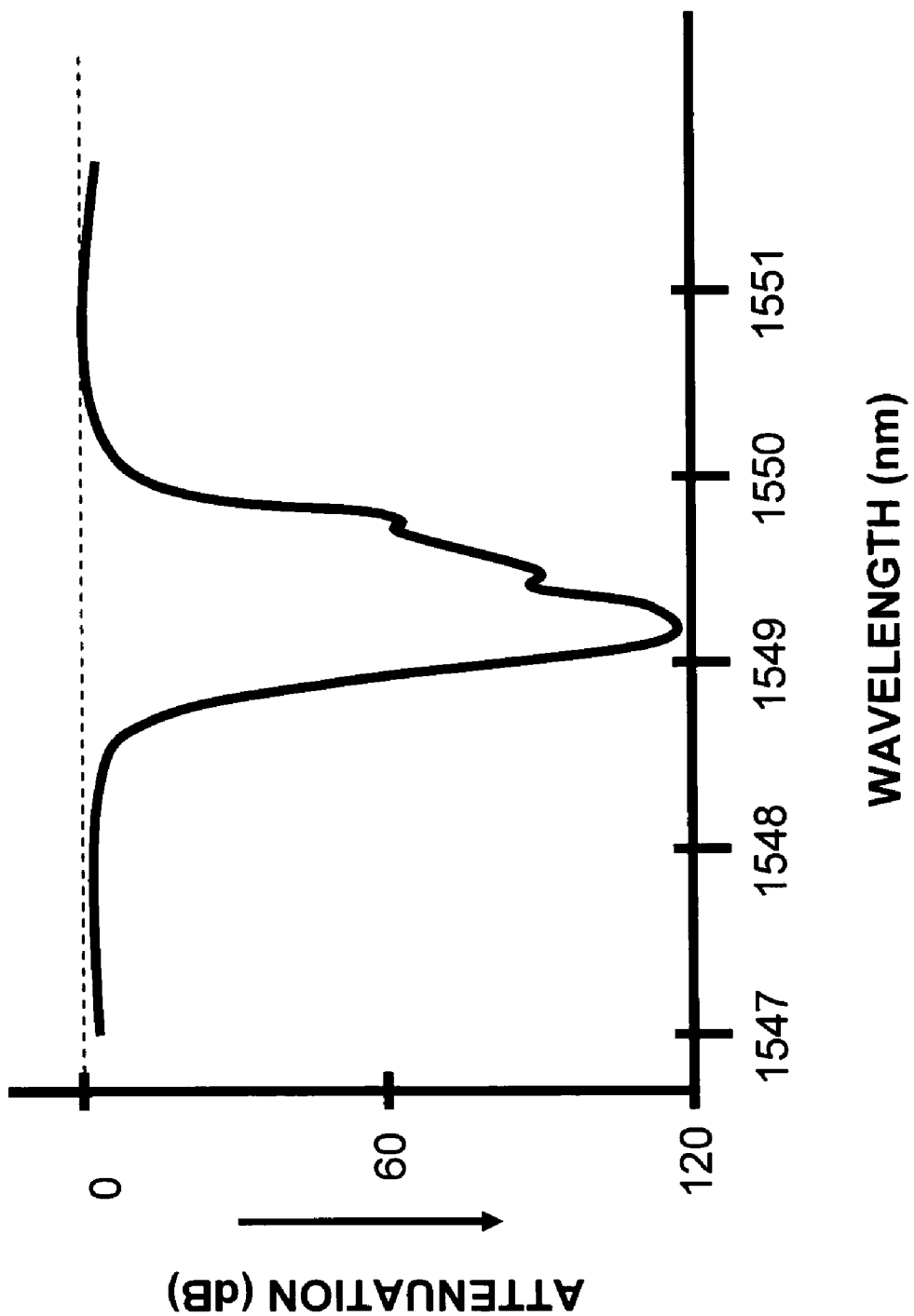
FIG. 3 is a plot of attenuation (dB) vs. wavelength (nm) for a second example of the optical filter (30) as used in the optical network of FIG. 1, as formed from a cascade of two 200 GHz and three 100 GHz filters with the same center wavelength.

In an example embodiment, optical filter 30 has a 3 dB blocking bandwidth in the range from about 0.2 nm to about 100 nm, and preferably in the range from 0.2 nm to 10 nm, with the maximum attenuation at the blocking wavelength in excess of 100 dB. FIG. 2 is a plot of attenuation (dB) vs. wavelength (nm) for a first example embodiment of optical filter 30. The attenuation plot of FIG. 2 has a 3 dB blocking bandwidth of about 0.9 nm with a 140 dB maximum attenuation at the blocking wavelength. FIG. 3 is a plot of attenuation (dB) vs. wavelength (nm) for a second example embodiment of optical filter 30. The attenuation plot of FIG. 2 has a 3 dB blocking bandwidth of about 1.4 nm with a 120 dB maximum attenuation at the blocking wavelength.

In an example embodiment, optical filter 30 is formed from combining a number of different blocking filters. In an example embodiment, five optical-drop filters from AC Photonics, Inc., Santa Clara, Calif., were used to create two different optical filters 30 having the attenuation characteristics of FIGS. 2 and 3, respectively. The example embodiment of FIG. 2 was created from five cascaded 100 GHz filters of the same center wavelength. The example embodiment of FIG. 3 was formed from a cascade of two 200 GHz and three 100 GHz filters with the same center wavelength. Note that similar filters can be created in the same manner to place the blocking bandwidth at or near the optical fiber dispersion minimum wavelength of 1310 nm.

With reference again to FIG. 1, transmitter T also includes a QKD transmitter ALICE optically coupled to transmission optical fiber 12 via an add port 35 of OADM 36. In an example embodiment, OADM 36 has multi-channel add/drop capability to accommodate sending synchronization signals SC between QKD transmitter ALICE and a QKD receiver BOB (introduced below). The synchronization signals SC are typically carried on a synchronization channel having a wavelength different from the quantum signal (channel) wavelength. Alternatively, the synchronization signals are added through DWDM 22.

With continuing reference to FIG. 1, the receiver side R of network 10 includes an OADM 50, similar to OADM 36, optically coupled to transmission optical fiber 12. The express (reflect) port 52 of OADM 50 is optically coupled to an isolator 54, which is optically coupled to an EDFA pre-amplifier 56, which in turn is optically coupled to a DWDM 60. A multi-channel receiver 70 is optically coupled to DWDM 60. Other example configurations contain only EDFA 56 or EDFA 26, but not both. In the case where EDFA 56 is not present, there is no need for isolator 54.

Receiver side R also includes an optical filter 76 optically coupled to the drop (pass) port 53 of OADM 50, and a QKD receiver BOB optically coupled to the optical filter. In an example embodiment, optical filter 76 has a 2 GHz bandpass centered on the quantum signal wavelength. This bandpass is about 50× more narrow than a standard telecom filter. As OADM 50 is similar to OADM 36, in an example embodiment OADM 50 also has multi-channel add/drop capability to accommodate sending synchronization signals SC between ALICE and BOB. Alternatively these synchronization signals can be retrieved via DWDM 60.

Method of Operation

Optical network 10 operates as follows. On the transmitter side T, multi-wavelength transmitter 20 generates classical signals CS1, CS2, . . . CSN of different wavelengths. In an example embodiment, two classical signals CS1 and CS2 are generated having respective wavelengths of 1552.52 nm (the "C31" wavelength) and 1546.12 nm (the "C39" wavelength).

The classical signals CS1, CS2, . . . CSN are multiplexed by DWDM 22 after which they are denoted in FIG. 1 as a single classical signal CS for simplicity. These signals are amplified by EDFA 26, which also produces large amounts of amplified spontaneous emission (ASE) noise in the quantum signal band. The combination of crosstalk through DWDM 22 and amplifier ASE can pollute the quantum channel with optical noise having power many orders of magnitude higher than the power of the quantum signals. Since the noise is in-band with the quantum channel, no level of filtering at the receiver-side can separate the quantum signals from the background noise. Therefore, the background noise within the quantum band must be reduced to levels roughly 30 dB below the power level of the quantum signals themselves before the quantum and classical signals can be combined.

The needed reduction in background noise in the quantum channel is accomplished with blocking optical filter 30. Narrow-band filtering with optical filter 30 about a narrow wavelength range surrounding the quantum signal wavelength provides a sufficiently "dark" quantum channel at a wavelength either within the classical signal channel wavelength band, or close to thereto, i.e., within about 100 nm or so, and more preferably very close thereto, i.e., within 10 nm or so. The amplified and filtered classical signals, denoted as CS', are then coupled into transmission optical fiber 12 via OADM 36.

Also at the transmitter side T, quantum signals QS (shown as a dashed-line optical pulse) are generated by ALICE. The present invention allows the operating wavelength of the quantum signals QS to be substantially closer to the classical signal wavelengths than prior art approaches. Both the quantum and classical signals can, for example, share the C-band within the third telecom window. In an example embodiment, the quantum signal wavelength falls within the bandwidth of the classical signals, i.e., is between at least two classical signal wavelengths. In an example embodiment, classical signals CS include wavelengths of ~1552.52 nm and ~1546.12 nm, while the quantum signal wavelength is ~1549.32 nm. This represents a spectral separation of the classical signals from the quantum signals of only ±3.2 nm. In the instant example, this allows for both the classical signals and the quantum signals to be transmitted at wavelengths within just a few nanometers of each other and at or near the optical fiber maximum transparency wavelength of 1550 nm.

Quantum signals QS are coupled into transmission optical fiber 12 through OADM 36. In an example embodiment, OADM 36 can also provide some additional pre-filtering to reduce any leakage from the DWDM (classical) channels and/or ASE from EDFA 26 at the quantum signal wavelength.

On the receiver side R, OADM 50 serves to separate the quantum signals QS and classical signals CS' arriving from the transmitter side T. Classical signals CS' are directed through isolator 54 to EDFA pre-amplifier 56 for amplification and are then separated by DWDM 60 and detected by multi-channel receiver 70. Isolator 54 cuts down on backward-propagating ASE from EDFA preamplifier 56, which when combined with Raleigh and Raman backscattering, can cause false clicks in Bob's single-photon detectors (not shown).

Figure 4:
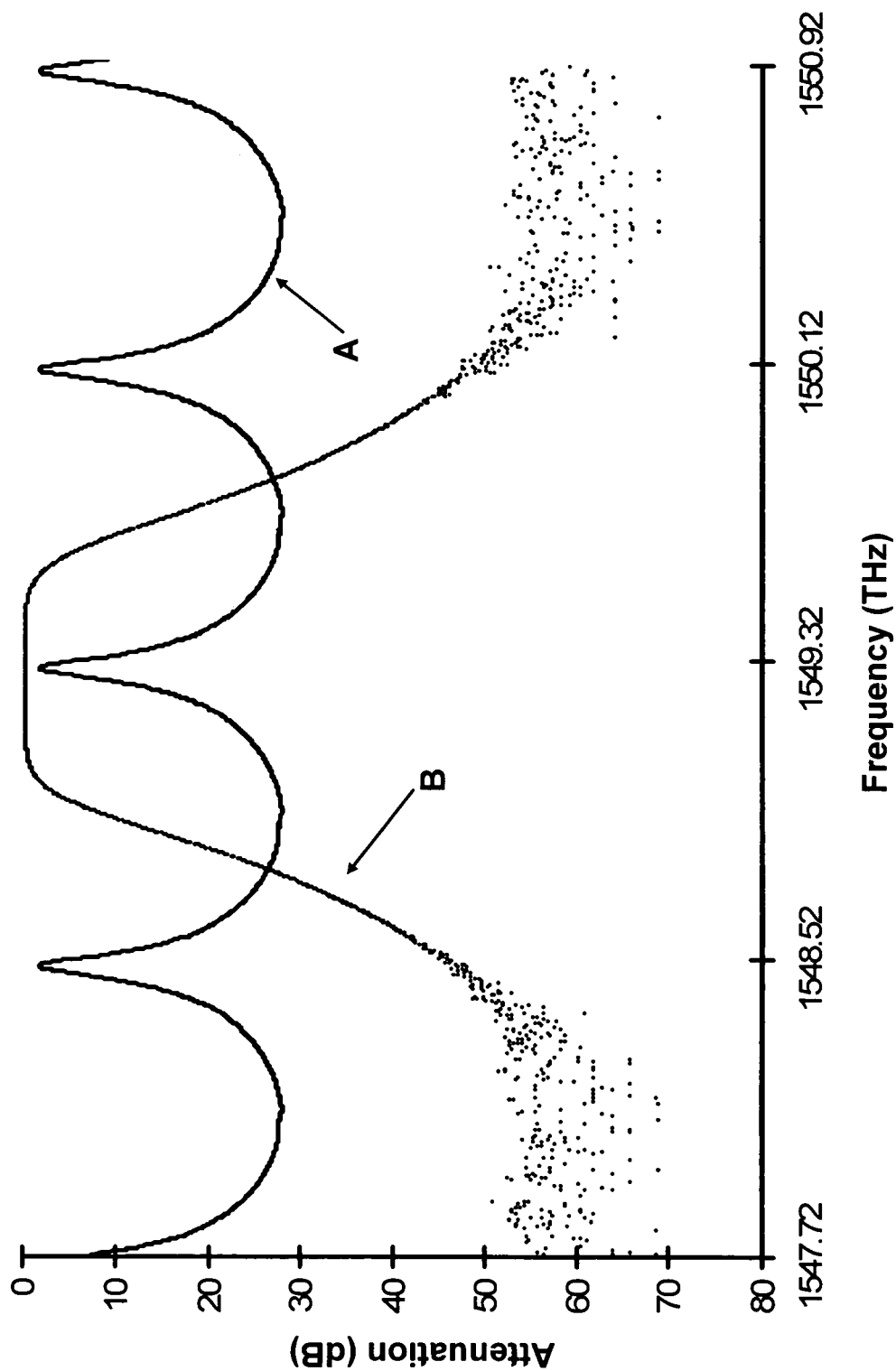
FIG. 4 is a plot of attenuation (dB) vs. frequency (THz) showing the individual curves for two different types of optical filters used to form the optical filter (76)
Figure 5:
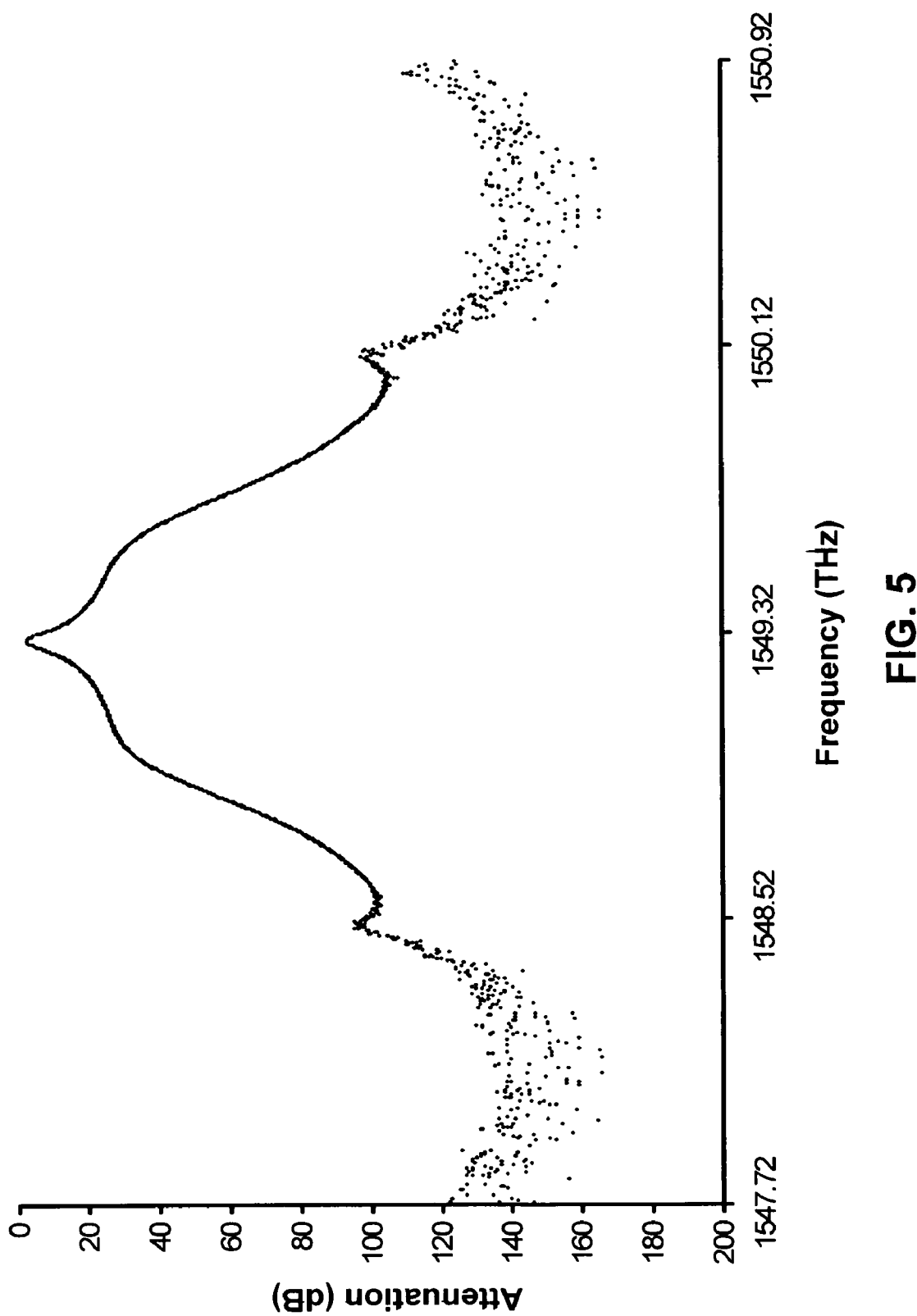
FIG. 5 is a plot of the attenuation (dB) vs. frequency (THz) for the optical filter (76) formed by combining the two filters shown in the plot of FIG. 4.

Meanwhile, quantum signals QS are directed from WDM 50 to narrow-band optical filter 76 that serves to reduce noise caused by spontaneous Stokes and/or anti-Stokes Raman scattering from the DWDM classical channels that could result in false counts at BOB. Since the optical bandwidth of the quantum signals is quite narrow, for example less than 1 GHz, using a standard 100 GHz telecom filter for optical filter 76 is rather ineffective. An example embodiment of optical filter 76 consists of or otherwise includes a combination of a 2 GHz Fabry-Perot filter with a 100 GHz free spectral range such as those manufactured by Micron Optics, Inc., Atlanta, Ga., together with two 100 GHz thin-film filters such as those produced by AC Photonics, Inc., Santa Clara, Calif. The attenuation of each of these individual components is shown in FIG. 4, with curve A representing the Fabry-Perot filter and curve B the thin-film filter. The attenuation of the combined assembly that forms optical filter 76 is shown in FIG. 5. The addition of the Fabry-Perot filter in this example reduces the number of false clicks caused by nonlinear scattering of classical signals into the quantum signal band by roughly a factor of 50. The filtered quantum signals QS, denoted as QS', are then received and detected by BOB.

Long-Haul Network Example

Figure 6:
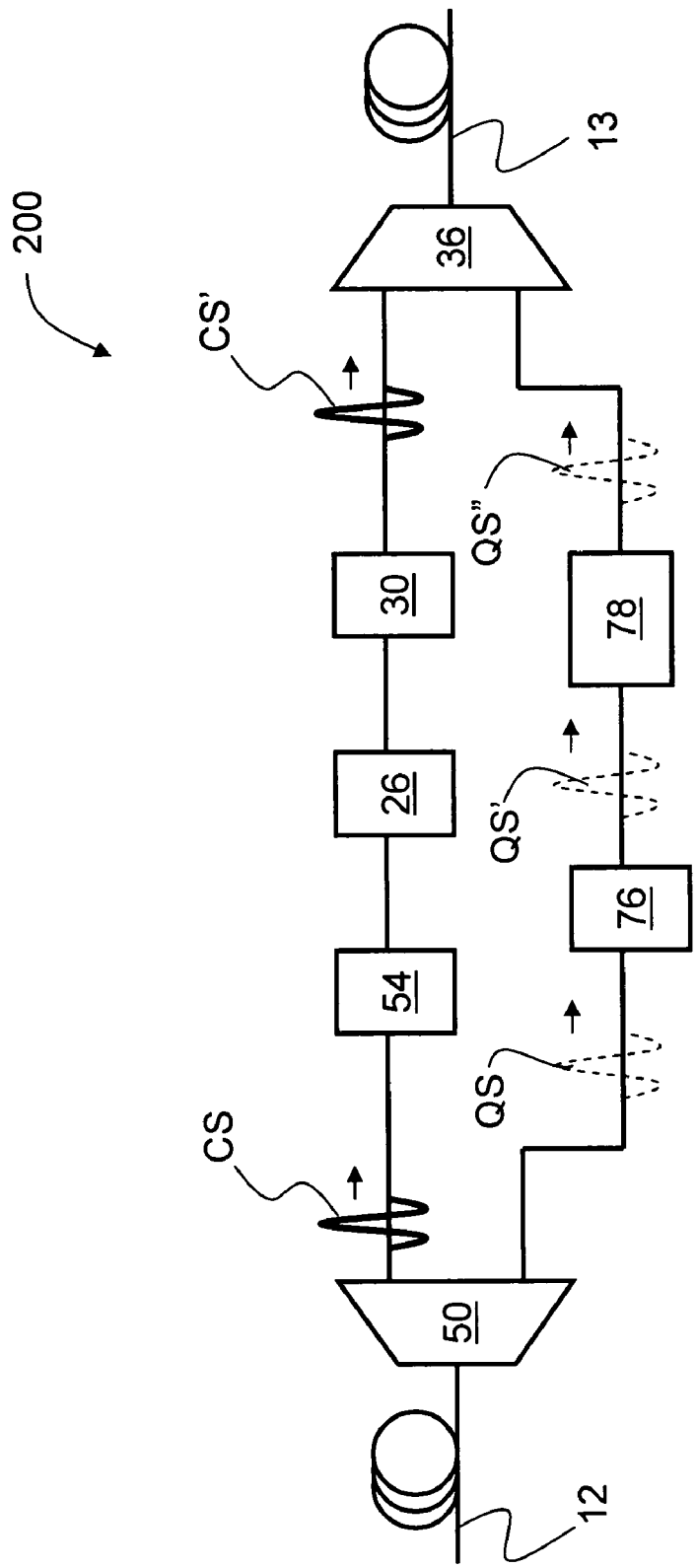
FIG. 6 is a schematic diagram of a section of an optical network, illustrating an example embodiment of how the present invention is used to support the co-propagation of quantum and classical signals on a long-haul fiber network.

FIG. 6 is a schematic diagram of a section 200 of an optical network, illustrating an example embodiment of how the present invention may be used to support the co-propagation of quantum and classical signals on a long-haul fiber network containing multiple optical amplifiers. The approach may use either optical-electrical-optical (OEO) regeneration of the QKD signals in a cascaded quantum key distribution system, or quantum repeaters.

Network section 200 includes OADM 50 optically coupled to a transmission fiber 12 connected at its opposite end to an upstream node (not shown). Likewise, network section 200 includes OADM 36 optically coupled to a transmission fiber 13 connected at is opposite end to a downstream node. OADMs 50 and 36 are used to separate and re-combine the classical and quantum channels. The classical channel includes isolator 54, optical amplifier 26 optically coupled to the isolator, and optical filter 30 optical coupled to the optical amplifier. The quantum channel includes optical filter 76 optically coupled to a QKD station

78. In an example embodiment, the optical network includes a number of sections 200, with QKD stations 78 cascaded along the network.

In the operation of network section 200, quantum signals QS and classical signals CS arriving from the previous (upstream) node (not shown) through transmission fiber 12 are separated by OADM 50. Classical signals CS pass through isolator 54 and are amplified by EDFA 26 and are then filtered with optical filter 30 to form filtered classical signals CS'. Meanwhile, quantum signals QS pass through narrow-band optical filter 76 to form filtered quantum signals QS', which are relayed or otherwise processed by QKD station 78 to form relayed quantum signals QS". The relayed quantum signals QS" and the filtered classical signals CS' are then recombined with OADM 36 and sent out over transmission fiber 13 to the next (downstream) node or QKD station (not shown). This process is repeated for the different network sections 200 making up the optical network.

While the present invention has been described in connection with preferred embodiments, it will be understood that it is not so limited. On the contrary, it is intended to cover all alternatives, modifications and equivalents as may be included within the spirit and scope of the invention as defined in the appended claims.

What is claimed is:

1. A method of transmitting, over a transmission optical fiber, classical signals having corresponding classical wavelengths and quantum signals having a quantum signal wavelength, the method comprising:
    filtering the classical signals to block wavelengths that include the quantum signal wavelength, wherein the filtering is performed over a narrow bandwidth centered on the quantum signal wavelength but that does not extend to the classical signal wavelengths, wherein at least one of the classical signal wavelengths is within 100 nm of the quantum signal wavelength; and
    filtering the quantum signals just prior to their detection to substantially exclude non-quantum signal wavelengths.

2. The method of claim 1, wherein at least one of the classical signal wavelengths is within 10 nm of the quantum signal wavelength.

3. The method of claim 1, wherein said bandwidth is 5 nm or less.

4. The method of claim 3, wherein said bandwidth is 1 nm or less.

5. The method of claim 1, wherein the quantum signal wavelength is between two classical signal wavelengths.

6. The method of claim 1, including amplifying the classical signals with an erbium-doped fiber amplifier (EDFA) prior to said filtering of the classical signals.

7. A method of transmitting classical signals and quantum signals over an optical fiber, comprising:
    generating classical signals at respective classical signal wavelengths;
    generating quantum signals at a quantum signal wavelength that is between at least two of the classical signal wavelengths;
    filtering the classical signals to block wavelengths that include the quantum signal wavelength but not the classical signal wavelengths, thereby forming filtered classical signals;
    multiplexing onto the optical fiber the filtered classical signals with the quantum signals;
    demultiplexing the filtered classical signals and the quantum signals; and
    filtering the quantum signals just prior to their detection to substantially exclude non-quantum signal wavelengths.

8. The method of claim 7, including amplifying the classical signals with an erbium-doped fiber amplifier (EDFA) prior to said filtering.

9. The method of claim 7, wherein the two classical wavelengths that surround the quantum wavelength are separated by no more than 10 nm.

10. The method of claim 7, wherein at least one of the at least two classical signal wavelengths is within 100 nm of the quantum signal wavelength.

11. The method of claim 7, wherein two of the at least two classical signal wavelengths are about 1552 nm and 1546 nm, and wherein the quantum signal wavelength is about 1549 nm.

12. The method of claim 7, wherein said filtering of the quantum signals includes passing the quantum signals through an optical filter having a 3 dB blocking bandwidth in the range from about 0.2 nm to about 100 nm.

13. The method of claim 7, wherein said filtering of the quantum signals includes passing the quantum signals through an optical filter having a 3 dB blocking bandwidth in the range from about 0.2 nm to about 10 nm.

14. The method of claim 7, wherein said filtering of the quantum signals includes passing the quantum signals through two or more optical filters.

15. An optical network system, comprising:
    a classical optical communications system adapted to generate and receive classical signals having respective classical signal wavelengths;
    a quantum key distribution (QKD) system having QKD stations ALICE and BOB respectively adapted to generate and receive quantum signals having a quantum signal wavelength;
    a transmission optical fiber adapted to carry both the classical signals and the quantum signals from a transmission side of the network to a receiver side of the network;
    a first optical blocking filter arranged so as to filter only the classical signals over a narrow spectral band that surrounds the quantum signal wavelength but that does not extend into the classical signal wavelengths so that the quantum signal wavelength is within 100 nm of one of the classical signal wavelengths;
    a multiplexing element arranged to combine the quantum signals and classical signals at the transmitter side of the network and a de-multiplexing element arranged at the receiver side of the network to separate the quantum signals and the classical signals at the receiver side of the network; and
    a narrow-bandpass filter adapted to filter the quantum signals at the receiver side of the network just prior to their detection to substantially exclude non-quantum signal wavelengths.

16. The system of claim 15, including an erbium-doped amplifier (EDFA) arranged optically upstream of said first optical filter and adapted to amplify the classical signals.

17. The system of claim 16, wherein the quantum signal optical wavelength falls in between two of the classical signal wavelengths.

18. The system of claim 16, wherein the quantum signal wavelength is within 10 nm of one of the classical signal wavelengths.

* * * * *